June 7, 1960   R. BOUFFILH ET AL   2,939,370
OPTICAL LINE-JUSTIFICATION DEVICE FOR PHOTO-COMPOSITION
Filed Sept. 18, 1956   4 Sheets-Sheet 4
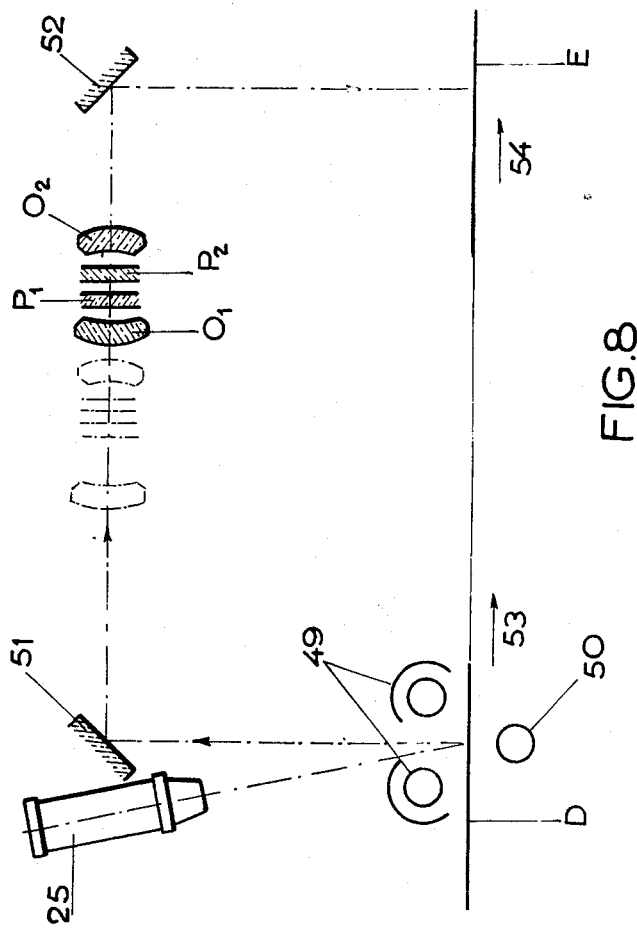
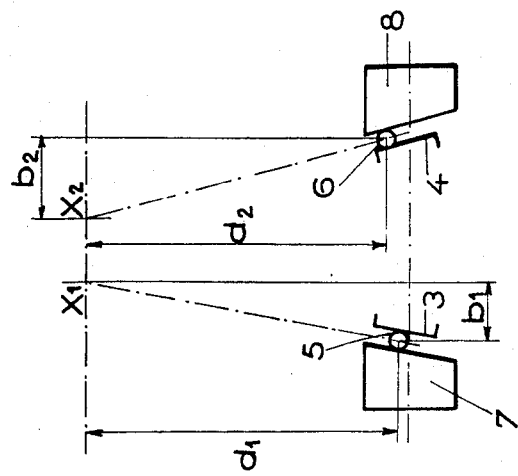

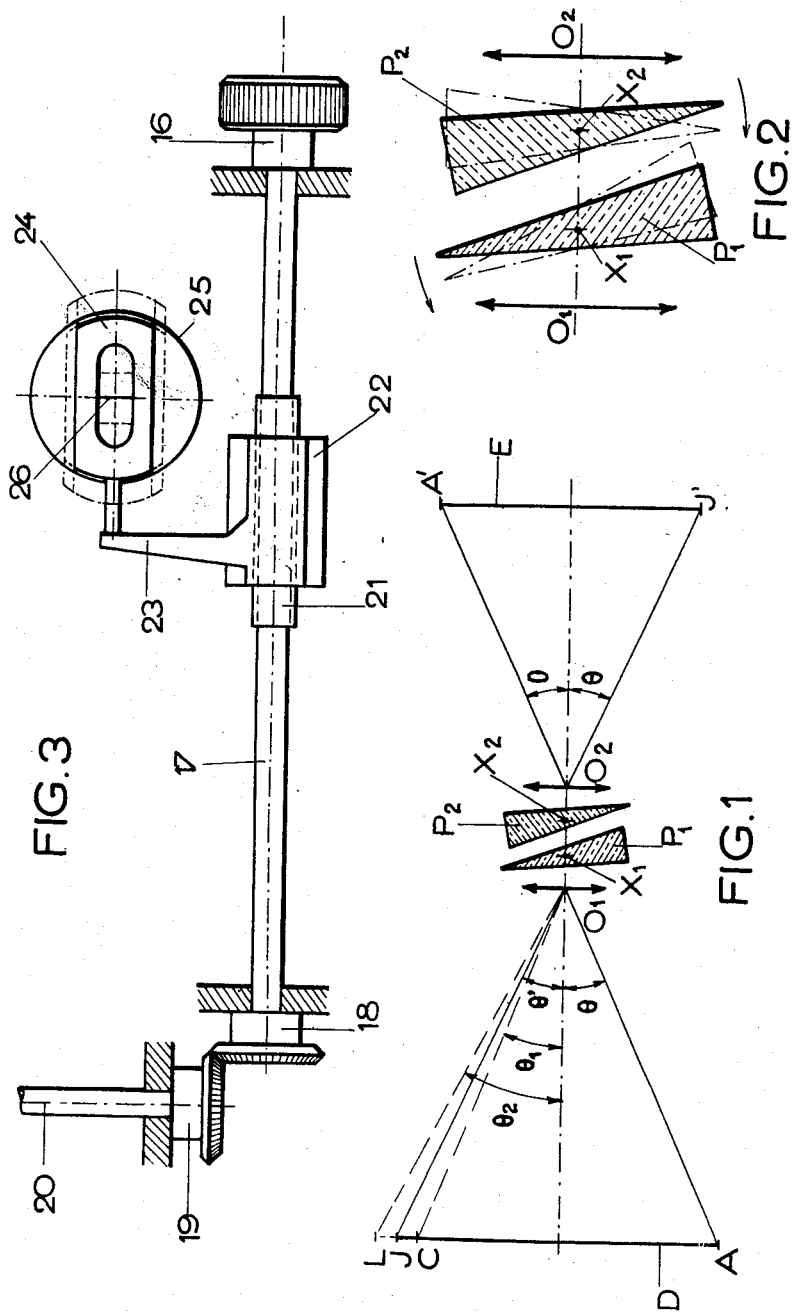

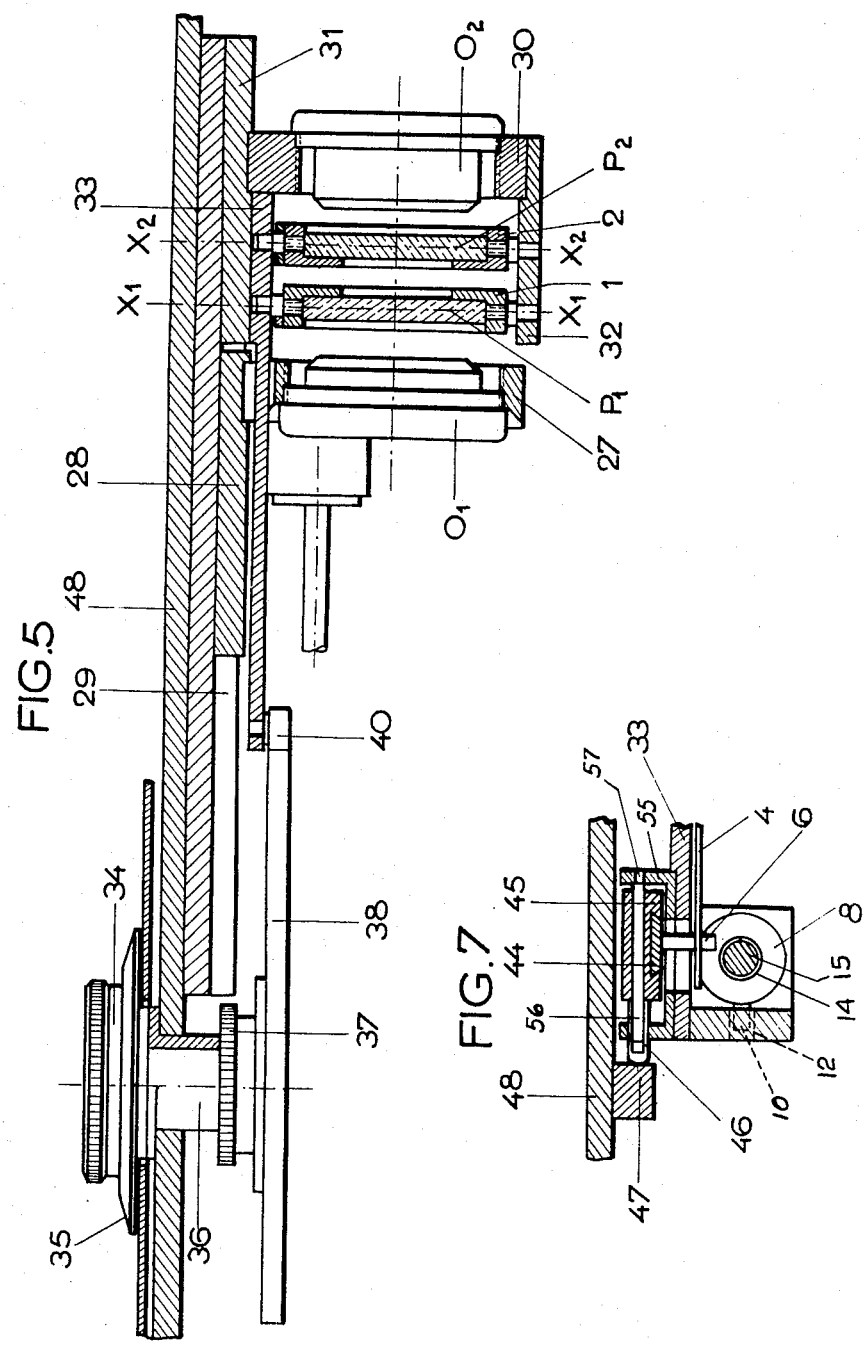

United States Patent Office 2,939,370
Patented June 7, 1960

2,939,370

OPTICAL LINE-JUSTIFICATION DEVICE FOR PHOTO-COMPOSITION

Raymond Bouffilh and Charles Savigny, Paris, France, assignors to Société Anonyme dite: Ateliers Bariquand & Marre, Arcueil (Seine), France Filed Sept. 18, 1956, Ser. No. 610,447

Claims priority, application France Sept. 23, 1955

4 Claims. (Cl. 95—4.5)

This invention relates to improvements in the optical systems of photo-composition machines which produce optical distortion effects intended more particularly for the justification of text lines, line after line.

The hitherto proposed devices of this character suffer from the inconvenience of requiring lateral displacements of one of the following three elements: the document, the optical system, or the sensitive emulsion, in order to center the lines to be justified with respect to one another.

The essential object of this invention is to provide an optical justification device characterized in that the above inconvenience is avoided since any relative lateral displacement of either the line to be justified, or the optical system, or the emulsion, is not necessary, so that the line justification and the page-setting take place simultaneously.

To this end, the device according to this invention comprises a pair of prisms rotatably mounted about axes parallel to the prism edges and disposed at right angles to the optical axis of the system, for example coincident therewith, the rotational displacements of both prisms about their respective axes being conjugate with but opposite to each other, these displacements being furthermore controlled as a function of the length of the line to be justified.

The rotation of these prisms permits the justification, that is the equality in length of the original line images, and their connection permits the page-setting, the image of the first letter on the left side of the text lines being constantly and automatically formed at the same point when the original lines begin at an equal distance from the edge of the sheet. The document and the emulsion are not moved otherwise than required for passing from one line to another.

The prisms are comprised of astigmatic optical systems but the justification optical device of which they are an integral part is as a whole stigmatic, in that it supplies a sharp image. The justifying distortion affects only the width of the letters.

A sighting device is directed toward the end of the lines to be justified for determining the adequate rotation of the aforesaid prisms.

The anamorphotic justification device comprising the aforesaid prism combination is associated with an optical reproduction device, and the complete assembly is incorporated in a reproduction chamber for the photo-composition, the magnification of the justified lines being permitted by the optical unit through the intermediary of a pair of suitable lenses of a type already known per se and such that the distance between the original document and the sensitive emulsion remains constant irrespective of the magnification value.

The control of the sighting device is the same for all magnifications, but the prism rotation varies with the magnifications to ensure the necessary justification.

In the descripiton of one preferred embodiment of the invention which appears in a later part of this specification, reference is made by way of example to a typewritten original, it being understood that the invention should not be construed as being limited to this specific form of embodiment. In typewritten originals, the typewriter operation provides automatically the alignment of the lines on the left-hand side. The purpose of the justification is to bring all the lines on a common line through a distortion which, as it takes place in the horizontal direction alone, respects and keeps to a constant value the height of the types. The common measure may be the measure of the longest line, and in this case the distortion will lengthen the short lines; this common measure may also be the measure of the shortest line, and in this case the distortion will shorten the long lines; in the specific embodiment to be described presently the common measure is the length of an average line, that is, the case in which the distortion must be effective in both directions for elongating the short lines and shortening the long lines, so as to bring but the least distortion in the average graphic aspect of the original. It is already known that horizontal distortions of the order of 10% produce in each type but an alteration hardly perceptible to the reader's eye. The length of the line to be justified is thus selected as a function of this maximum distortion and of the type style characterizing the original type so that, considering the over-run of types, a margin of five or six types remains available at the end of the line to decide for the cutting of phrases and words; the aforesaid margin constitutes the justification zone and corresponds itself to 10% of the line justified or to be justified. The typewritten original considered in the exemplary form of embodiment of the invention which is described hereafter can be obtained by using any commercial typewriter equipped with variable-width types. This kind of typewritten texts was chosen to demonstrate the continuity and accuracy of the adjustment as well as the continuous justifying capacities of the system described herein. It will be readily understood by anybody conversant with the art that any typewritten impression made with uniform types would require predetermined adjustments and justification effects on one, two, three, $n$ . . . types, without departing from the field of application of this invention.

A specific embodiment of the invention is described hereafter with reference to the attached drawings forming part of this specification and illustrating diagrammatically by way of example a typical embodiment of the invention.

In the drawings:

Figure 1 is a diagrammatic plane view from above of the justification device.

Figure 2 is a diagram showing on a larger scale the movements of the prisms P1 and P2 of the device.

Figures 3, 4 and 5 are a plane view from above, a plane view from beneath and a sectional elevation, respectively, showing the members whereby the prisms P1 and P2 are rotated.

Figure 6 is a detail view showing diagrammatically the manner in which the prism movements are controlled.

Figure 7 is a part-sectional view taken upon the line VII—VII of Fig. 4, and

Figure 8 is a complete view illustrating diagrammatically the typical arrangement of a reproduction chamber according to the teachings of this invention.

Figure 4:
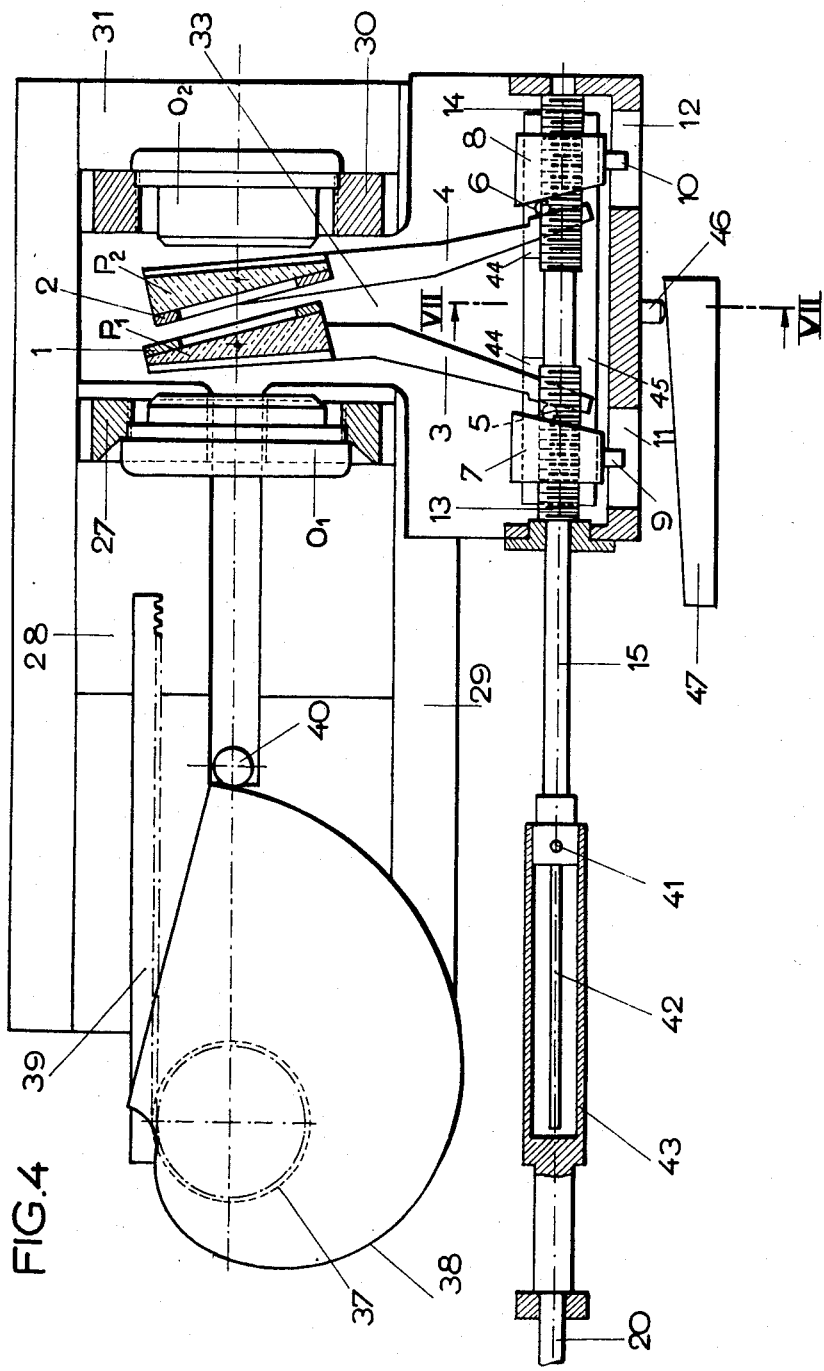

The pair of prisms P1 and P2 are mounted for oscillation about two axes X1, X2 parallel to the vertices of these prisms. Stigmatism requirements are such that this assembly must operate under parallel-light conditions; consequently, the two lenses O1 and O2 of focal length $f1$ and $f2$ respectively, on either side of the prisms P1 and P2 must be operatively connected to each other. The document D is positioned in the object focal plane of the lens O1, whereas the emulsion E is positioned in the image focal plane of the lens O2. AJ is the line to be reproduced. A being the beginning of the line and J the end of the line. The measure AJ represents the justification measure common to all the lines of the text, as already explained hereinabove. Under these conditions, as A is common to all the lines, AL will represent the too long lines and AC the too short lines. The distance CL designates the justification zone of which the limits have been defined hereinabove.

The point A' on the sensitive emulsion is the image of point A and J' is similarly the image of point J, assuming that the anamorphotic system were removed. When the anamorphotic system is interposed points A' and J' must be common for all the line reproductions, irrespective of the length of these lines. When the justifying effect is null, the prism P1 is positioned for the minimum deflection of the parallel beam issuing from A through O1; and the prism P2 is at its minimum-deflection position with respect to this beam after its refraction by P1. The assembly is equivalent to a parallel-sided plate and will neither lengthen nor shorten the line image. The ratio $$\frac{A'J'}{AJ}$$

is equal to the magnification of the reproduction lens, that is, in the case considered herein, $G=f2/f1$.

The diagram of Fig. 2 shows the movements of the prisms P1 and P2 which take place for, on the one hand, ensuring the fixedness of the point A' which is the image of A on the emulsion, and, on the other hand, the concordance at the point J' of the images of all the points from C to J and from J to L through a reverse displacement. The points from C to L, which correspond to the ends of lines, are identified with the assistance of an optical sighting device of which the displacements are operatively connected to the prisms system to rotate this device and provide an automatic correction. As the prism P1 rotates through a certain angle about its axis X1 in the direction shown by the arrow in Fig. 2, the law of refraction is applied to determine the position of P2 so that the beam issuing from A is practically undisturbed; in other words, P2 is pivoted about its axis through a very similar angle but in the reverse direction. Thus, the connection just defined hereabove between P1 and P2 provides a fixed position at the point A' which is the image of A on the emulsion, irrespective of the movements impressed to P1.

The thick lines in the diagram of Fig. 2 illustrate the position of the prisms when the anamorphotic effect is zero, and the dotted lines show their positions when the maximum elongating anamorphotic effect is attained. This latter case represents the anamorphosis of line AC in Fig. 1. The beam issuing from C at an angle $O_1$ is so deflected as to impinge the emulsion surface at J'. Therefore, the image of the line AC has been lengthened to coincide with the image A'J'. The shortening effect which projects the image of AL to coincide with that of A'J' is obtained by pivoting the prisms in a direction opposite to that in which the prisms are rotated to lengthen the object. The lengths of the lines ranging from AC to AL are corrected through smaller, not strictly proportional rotational movements. The positions of the axes X1 and X2 indicated on the optical axis are not subordinate to imperative requirements since the only important factor is the angular setting of the prisms.

Figure 4 illustrates in plane view from beneath and Fig. 5 in elevational section the mechanism for rotating the prisms P1 and P2. These prisms P1 and P2 are mounted in rims 1, 2 movable about axes X1 and X2 respectively. These rims are rigid with steel levers 3, 4 respectively which are urged by suitable spring means (not shown) against cylindrical followers 5, 6 engaging plane and conveniently inclined surfaces formed on axially aligned nuts 7, 8, the followers 5, 6 being guided by dovetail assemblies (see 44, Fig. 7) in a direction parallel to the axis of the screws engaged by the aforesaid nuts and described hereafter. Dovetail assembly 44 supports the cylindrical follower 6 as shown in Fig. 7 and slides a support 45 parallel to the axis of screw 14. A similar apparatus is connected to screw 5. The nuts 7, 8 are held against rotation by pins 9, 10 slidably engaging corresponding slots 11, 12 and are only allowed to move axially along a pair of axially aligned screws 13, 14 formed on or rigid with a common shaft 15; these screws 13, 14 are of same pitch but their threads are of opposite direction, one being a left-handed screw and the other a right-handed screw. Thus, when the shaft 15 is rotated the relative spacing of nuts 7 and 8 is altered and the angular setting of prisms P1, P2 is modified accordingly. Fig. 3 is a plane view from above showing that the shaft 20 rigid with the aforesaid shaft 15 is adapted to be rotated by actuating a knurled button 16 secured on a shaft 17 connected through a bevel gear 18, 19 to this shaft 20. Moreover, when the adjustment button 16 is rotated the screw-threaded portion 21 of shaft 17 produces an axial movement of an internally screw-threaded socket 22 having rigidly secured thereon a bent arm 23 carrying the eyepiece 24 in the sighting device 25. This eyepiece 24 is provided with a vertical reference line 26 for pointing the end of the line of types.

The distances $d1$ and $d2$, $b1$ and $b2$ are determined by calculus so that the anamorphotic device will meet the following requirements, irrespective of the anamorphotic value:

(a) no movement at the beginning of the line (direction O);

(b) constant proportion between the value to be corrected and the angle of rotation of the adjustment screw.

Condition (b) will facilitate the connection between the line end sight and the control screw since, as already explained hereinabove, the rotation of the prisms will not involve any proportional effects.

It is stated hereinabove that the anamorphotic device operates normally under parallel-light conditions. In fact, satisfactory results are still observed when the anamorphotic device operates in substantially parallel-light conditions; the present invention makes the most of this tolerance, as will be described presently, to permit, independently of the horizontal justifying distortion, variations in the size of the type bodies through a continuous variation in the reproduction scale within the limits corresponding to the practical requirements of photo-composition.

The lens O1 is rigid with the barrel 27 carried in turn by a carriage 28 slidably mounted in a support 29. The lens O2 is rigid with the barrel 30 carried in turn by another carriage 31 slidably mounted in the same support 29 as the former carriage 28. The rims 1 and 2 of prisms P1 and P2 are connected through two pairs of trunnions to upper and lower plates 32, 33 rigid with the barrel 30 and carriage 31.

The manual adjustment means for controlling the variations in magnification comprise a knurled button 34 having a graduated dial (not shown) on its tapered surface 35. This button 34 is rigid with the shaft 36 on which a toothed wheel 37 and a cam 38 are keyed or otherwise rigidly secured. The toothed wheel 37 is in driving engagement with a rack 39 (Fig. 4) formed or secured on the sliding carriage 28. On the other hand the cam 38 is engaged by a follower 40 in the form of a roller 40 in this example and this roller 40 is mounted on an extension of plate 33. Adequate spring means are provided for constantly urging the roller 40 against the profile of the cam 38. The cam profile is designed to meet the well-known requirements concerning the displacement of the two lenses so as to ensure the sharpness of the image on the emulsion irrespective of the reproduction scale, and without requiring any modification as to the distance from the document to the emulsion. The displacement of the plate 33 produces the same axial displacement of the shaft 15. The operative connection between the shafts 15 and 20 is obtained through pins 41 projecting from the shaft 15 and engaging longitudinal slots 42 formed in a socket 43 rigid with the other shaft 20.

It is obvious that—as may be determined by calculus—to different magnifications there must correspond different displacements of the prisms to correct the same justification value taken on the line to be justified by pointing the reference line 26 in the sighting device 25. The displacement of the plate 33 which corresponds to the variations in the magnification controls automatically the correction of the ratio between the rotation of the prisms and the rotation of the shaft 20 through variations in the values of $d1$ and $d2$, these variations being obtained by using the following mechanism shown in Figs. 4 and 7, a bracket 55 is affixed to plate 33 for movement therewith and supports a rod 56 at one end on which the support 45 is mounted for axial movement relative to the rod such that a cam follower 46 formed on support 45 may engage a cam face 47 affixed to the frame 48 of the apparatus causing a transverse movement of support 45 and moves followers 5 and 6 to vary $d1$ and $d2$ during magnification adjustment displacement of plate 33. The flat faces of nuts 7, 8 engaged by followers 5 and 6 are inclined to the axis of shaft 15 as to prevent the aforesaid displacement from causing the rotation of the prisms P1, P2 when the latter are in their "no effect" position.

Figure 8 is a complete diagram showing a reproduction chamber arranged in accordance with the teachings of this invention. D is the original document, 49 the light source for opaque documents, and 50 the light source for transparent documents; the device comprises mirrors 51, 52, the lenses O1, O2, the prisms P1, P2, and the sighting device 25; the prisms-lenses assembly is shown in its two end positions; and E is the sensitive emulsion. The arrows 53, 54 designate the displacements from one line to the other of the document and of the sensitive emulsion.

What we claim is:

1. Apparatus for photographically reproducing copy text line by line in justified form wherein the copy and the photographic film move simultaneously in the same plane, optical apparatus interposed between said copy text and film for justifying said text line whereby said justified line may be transferred to said film, said optical apparatus including a first objective lens mounted upon a first movable carriage for focal adjustment with respect to the copy text, a second objective lens in constant pre-determined spaced relation to said first lens supported upon a movably mounted second carriage for focal adjustment with said film, a pair of prisms rotatably mounted on axes parallel to each other and to the vertices thereof positioned between said first and second lens and mounted upon said second carriage, means mounted on said second carriage for simultaneously rotating said prisms equal degrees in opposite directions, said means including lever arms affixed to each of said prisms indirectly engaged by a pair of feed nuts mounted on a common shaft, one of said feed nuts cooperating with right hand threads formed on said shaft and the other feed nut cooperating with left hand threads formed on said shaft whereby said levers and prisms will be pivoted in opposite directions upon rotation of said shaft to vary the distortion of the copy text line image passing through said prisms and common actuating means for moving said carriages in a direction parallel to the optical axis of said lenses determining the position of said first and second carriage means whereby said first and second lenses may be maintained in predetermined variable spaced relationship at each setting of said actuating means for focused magnification of said copy text line image.

2. Apparatus for photographically reproducing copy text as in claim 1 wherein a view finder is operatively connected to said shaft whereby said shaft may be rotated to align said view finder with the end of the copy text line thereby determining the degree of rotation of said prisms and the image distortion produced thereby.

3. Apparatus for photographically reproducing copy text as in claim 1 wherein a feed nut follower is interposed between said feed nuts and levers and first compensation means are formed on said feed nuts engageable by said followers and second compensation means are adapted to vary the position of said feed nut followers on said first compensation means in accordance with the relative position and spacing of said first and second lenses whereby a pre-determined relationship between the rotative positions of said prisms may be maintained with regard to the spacing of said lenses.

4. Apparatus for photographically reproducting copy text as in claim 3 wherein said first compensating means comprises surfaces formed on said nuts angularly disposed to said optical axis and said second compensating means includes a cam fixed with respect to said second carriage and shaft movement, and a cam follower adapted to vary the distance between said feed nut followers and said optical axis and the position of said feed nut followers on said angularly disposed surfaces.

References Cited in the file of this patent

UNITED STATES PATENTS

| | | |
|---|---|---|
| 791,062 | Wetmore | May 30, 1905 |
| 818,553 | Phillips | Apr. 24, 1906 |
| 1,307,598 | Phillips | June 24, 1919 |
| 1,918,488 | Rackett | July 18, 1933 |
| 2,174,194 | Nemnich | Sept. 26, 1939 |
| 2,421,656 | Smith | June 3, 1947 |